United States Patent
Bolanos

(10) Patent No.: US 7,690,349 B2
(45) Date of Patent: Apr. 6, 2010

(54) THROTTLE BODY SPACER FOR USE WITH INTERNAL COMBUSTION ENGINES

(75) Inventor: Robert Bolanos, Cypress, TX (US)

(73) Assignee: GSP Powerspacer, Inc., Cypress, TX (US)

( * ) Notice: Subject to any disclaimer, the term of this patent is extended or adjusted under 35 U.S.C. 154(b) by 329 days.

(21) Appl. No.: 11/701,670

(22) Filed: Feb. 2, 2007

(65) Prior Publication Data
US 2008/0041352 A1  Feb. 21, 2008

Related U.S. Application Data

(60) Provisional application No. 60/765,155, filed on Feb. 3, 2006.

(51) Int. Cl.
*F02M 29/00* (2006.01)
*F02B 31/00* (2006.01)

(52) U.S. Cl. ........................ 123/306; 123/590

(58) Field of Classification Search ................ 123/590, 123/184.53, 593, 184.21, 306, 592, 591
See application file for complete search history.

(56) References Cited

U.S. PATENT DOCUMENTS

| | | | | |
|---|---|---|---|---|
| 4,305,348 A | * | 12/1981 | Martin | 123/41.82 R |
| 4,317,663 A | * | 3/1982 | Dollar | 55/413 |
| 5,758,614 A | * | 6/1998 | Choi | 123/184.53 |
| 6,170,460 B1 | * | 1/2001 | Buswell et al. | 123/306 |
| 6,338,335 B1 | * | 1/2002 | Patterson et al. | 123/590 |
| 6,840,212 B2 | * | 1/2005 | Kim | 123/306 |

* cited by examiner

*Primary Examiner*—Noah Kamen
(74) *Attorney, Agent, or Firm*—Strasburger & Price, LLP

(57) ABSTRACT

A throttle body spacer for improving engine performance is provided. It comprises a spacer block with a smooth bore hole, a plurality of air fins, each air fin being connected at one end to the spacer block and the distal end extending to about the center of the bore hole, and a means for mounting the throttle spacer body to hold it in place. In one embodiment the spacer block forming the throttle spacer body is square with a single bore hole in the center. There are four air fins, one mounted from about the middle of each side of the spacer body, that extend to about the center of the hole. The air fins can be made from aluminum and are bent at a forty-five degree angle. In order to accomplish the goal of absorbing less heat, the spacer block forming the throttle body spacer is comprised of thermoset resin. The throttle body spacer has holes located near each corner where fastening elements can be inserted to hold the apparatus in place.

18 Claims, 6 Drawing Sheets

THROTTLE BODY SPACER FOR USE WITH INTERNAL COMBUSTION ENGINES

CROSS-REFERENCE TO RELATED APPLICATION

This application claims priority to U.S. Provisional Application No. 60/765,155 filed Feb. 3, 2006, entitled "Air Intake Manifold".

BACKGROUND OF THE INVENTION

I. Field of the Invention

The present invention relates generally to the field of apparatus that may increase horsepower, torque, or fuel efficiency in internal combustion engines.

II. Background and Prior Art

There are many different devices available to consumers that are designed to increase power and torque and to improve fuel efficiency in the internal combustion engines of automobiles. One such product is known as a throttle body spacer. Such devices are available from several manufacturers including Airaid®, Jet Performance Products™, and AEM™. They are especially useful with sport utility vehicles, such as Jeep® vehicles, and with any engine having 4.0 L displacement throughout the whole RMP range. The prior art products are machined from aluminum and are square with a hole in the center. Throttle body spacers are typically designed to be installed between the engine's throttle body and intake manifold.

However, the prior art devices leave unburned fuel in the manifold so the devices fail to increase performance and have little if any effect on fuel efficiency. Another drawback is that the devices of the prior unit give a jerky response below fifty-five miles per hour and fail to provide the desired results at speeds above fifty-five miles per hour, as well as at higher revolutions per minute (RPM). These prior designs use aluminum material, which absorbs tremendous heat, reducing efficiency. They also have a rigid surface that can be described as a screw-like texture with grooved, circular indentations on the walls of the center bore hole. These indentations restrict and slow down the air flow, especially at speeds above fifty-five miles per hour, resulting in minimal performance gains. The rigid surface also facilitates the accumulation of carbon deposits, which further slows air transition and reduces effectiveness. The available products in the industry fail to overcome these deficiencies; they do not increase fuel efficiency and are only remotely useful at very slow speeds.

Therefore, one object of the present invention is to provide a throttle body spacer that effectively increases horsepower, torque, and fuel efficiency of internal combustion engines.

It is also an object of the invention to provide a throttle body spacer that improves air flow transitions as well as air fuel mixture atomization.

It is another object of the invention is to provide a throttle body spacer with reduced heat absorption and cooler air transfer.

It is also an object of the present invention is to provide a throttle body spacer that reduces carbon deposit buildup.

SUMMARY

Accordingly a throttle body spacer for effectively increasing horsepower, torque, and fuel efficiency in internal combustion engines is provided. It comprises a spacer block with a smooth bore hole, a plurality of air fins, each air fin being connected at one end to the spacer block and the distal end extending to about the center of the bore hole, and a means for mounting the throttle spacer body to hold it in place. The new throttle body spacer is formed of a thermoset resin which absorbs significantly less heat compared to the aluminum designs of the prior art. By keeping the inner air temperatures lower, cooler dense air is atomized with greater efficiency, which equates with increased horsepower and improved fuel economy. The bore hole(s) of the new apparatus are polished to a smooth, slick finish; so airflow passes through smoothly with no restrictions. The thickness, also referred to as the height, of the throttle body spacer is such that it increases the velocity and force of the air as it passes through the throttle body spacer and into the manifold.

To add to this equation, the air fins, which are narrow enough to let air pass through yet wide enough to still have sufficient structural strength, are bent at an angle such that they direct the air in a spiral motion, creating a spinning turbulence in the incoming air so that is has a much greater velocity as it enters the air intake manifold. The air fuel mixture is atomized with the motion of the air fins making it more efficient as it enters the engine. Putting the air fuel mixture to greater use, as it enters the engine, produces more horsepower, torque, and better fuel economy as less unburned fuel is left in the manifold. The air fin design and the smooth bore produce a smoother, quicker throttle response with increased horsepower at all engine speeds, whereas other designs only respond at lower speeds. Furthermore, the smooth design of the center hole further optimizes performance by reducing carbon deposit buildup.

BRIEF DESCRIPTION OF THE DRAWINGS

For a further understanding of the nature and objects of the present invention, reference should be had to the following figures in which like parts are given like reference numerals and wherein.

DETAILED DESCRIPTION OF THE PREFERRED EMBODIMENTS

Figure 1:
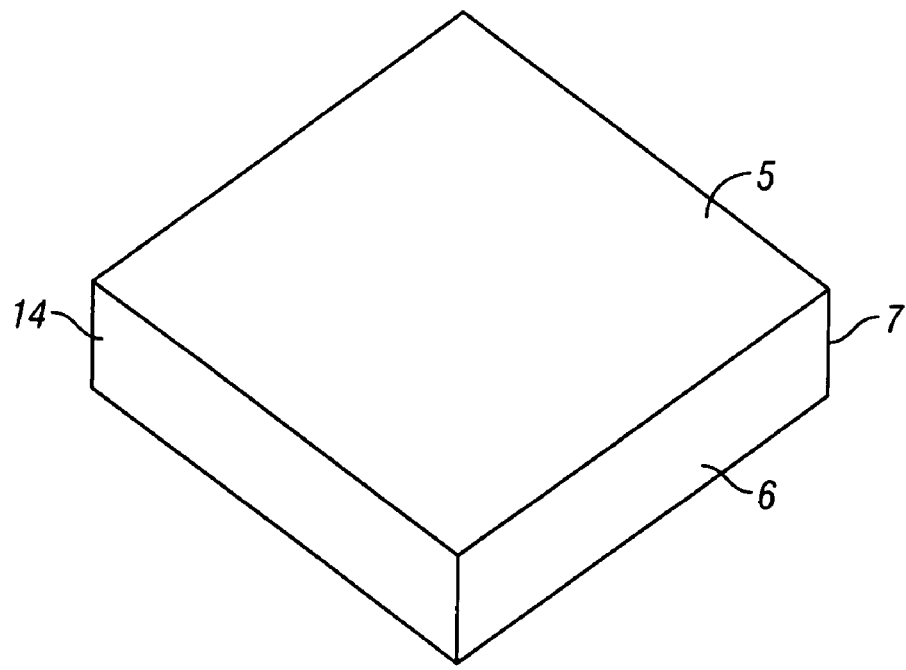
FIG. 1 depicts a spacer block comprised of thermoset resin.

Referring to FIG. 1, a square throttle body spacer block 5 is shown. The spacer block 5 is preferably made of thermoset resin which absorbs significantly less heat than aluminum. It is preferable to use virgin Teflon® which has a high maximum service temperature of 554° F. The spacer block 5 can range in thickness and height from about 3/8 inches to 2 inches and is preferably one inch thick. The width and length of the preferred embodiment are 3 1/8 inches×3 1/8 inches. In another embodiment, the block 5 may be a rectangular block, ranging in rectangular profile size from about 3 inches×5 inches to about 5 inches×7 inches. In the preferred embodiment, the one inch thickness of the throttle body spacer block 5 increases the velocity and air force as it passes through the spacers. A meter saw or a table saw (not shown) may be used to ensure that all sides 14 are smooth cut. The edges 6 and corners 7 may be smoothed with a hand file or with 120 grit sandpaper to ensure that they are not sharp.

Figure 2:
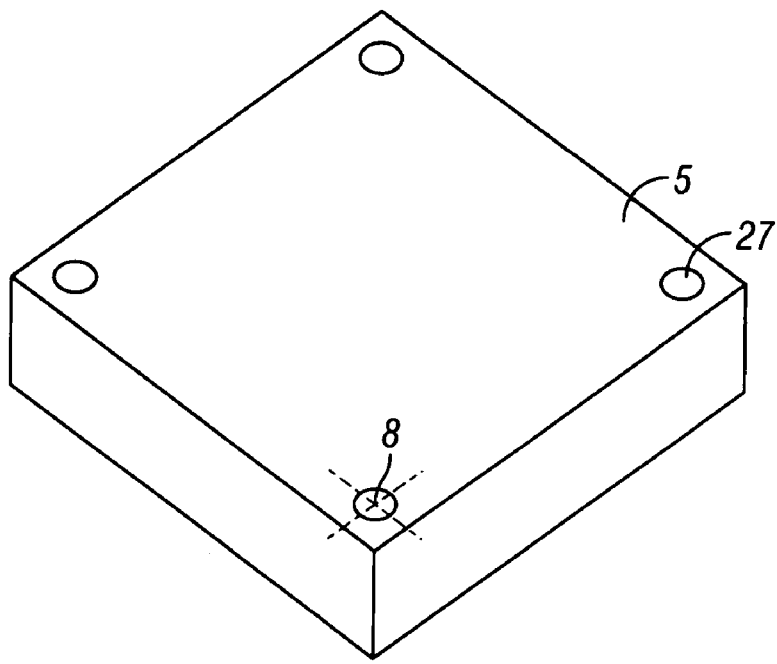
FIG. 2 depicts a spacer block with holes that have been drilled in each of the four corners.

In FIG. 2 the spacer block 5 is shown with four holes 27 formed then through at the corners, which holes 27 can be used with fastening elements, for mounting spacer block 5 between throttle body 35 and intake manifold 30. The holes can be drilled for example by using a 3/8 inch drill bit in a drill press (not shown). Preferably there is a distance of 5/16" from the edge 6 of the block 5 to the center of the hole 8.

Figure 3:
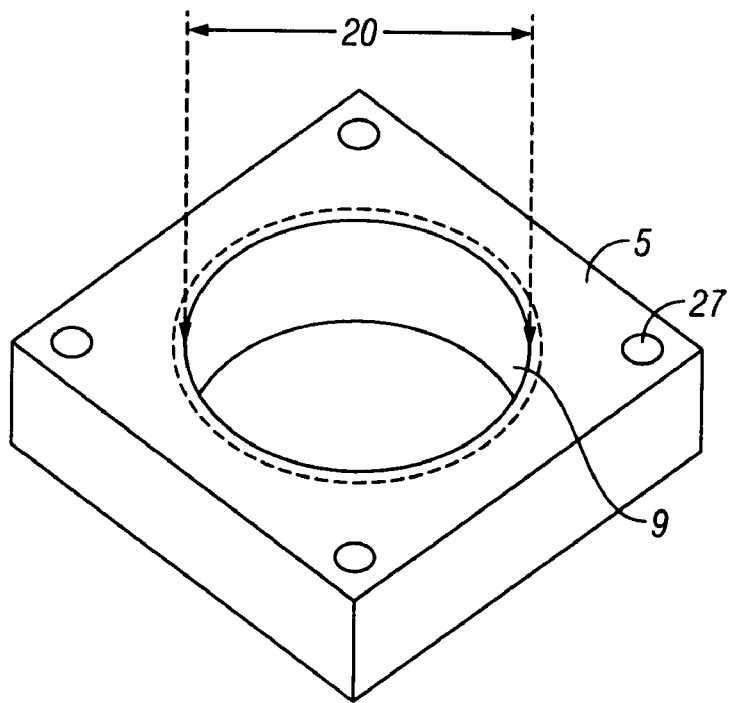
FIG. 3 depicts a spacer block with corner holes and with a center bore hole.

FIG. 3 depicts the spacer block 5 with a smooth center bore 20. The bore 20 can for example be drilled using a 57 mm bore bit with a drill press in the center of block 5. The bore hole 20 may range in diameter from about 55 mm to 75 mm but preferably is 60 mm in diameter. This can be achieved by sanding bore 20 with 80 grit and then 120 grit sandpaper (not shown) after drilling. To ensure a smooth surface 9 of the bore hole 20, a fine polishing brush sanding disc (not shown) can be used. The smooth surface 9 of bore hole 20 results in a smoother air transition. In embodiments where spacer block 5 is rectangular in shape, there may be more than one bore hole 20.

Figure 4:
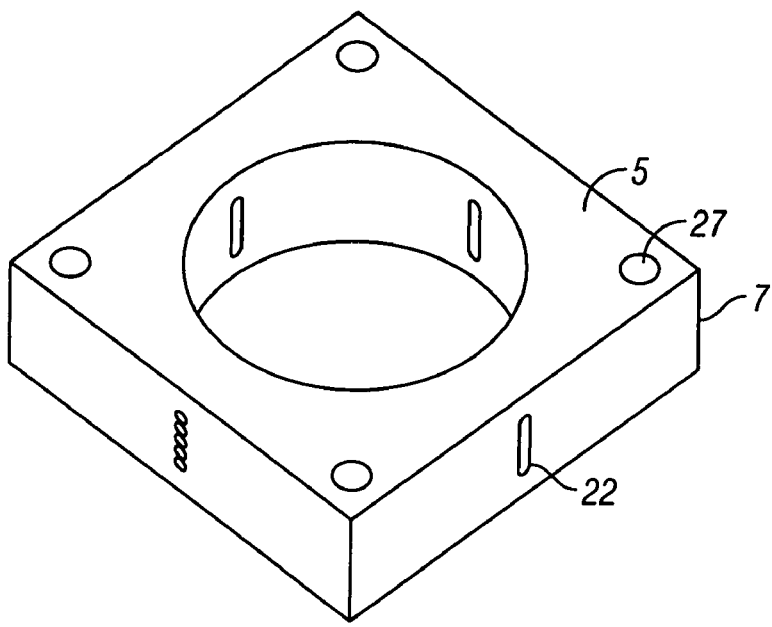
FIG. 4 depicts the spacer block of FIG. 3 with center slots for aluminum air fins.

FIG. 4 shows the spacer block 5 with slots 22 formed therein where air fins 25 are to be inserted. The center of slot 22 is midway between the edges 7 of the spacer block 5. To create the slots 22, a 3/32" drill bit can be used. First three to four holes can be made, then the drill may be moved in a rocking motion to provide a slot 22. This is repeated for all four sides of the square spacer block 5. The dimensions of the air fin slots 22 are preferably 3/32 inches×1/2 inches.

Figure 5:
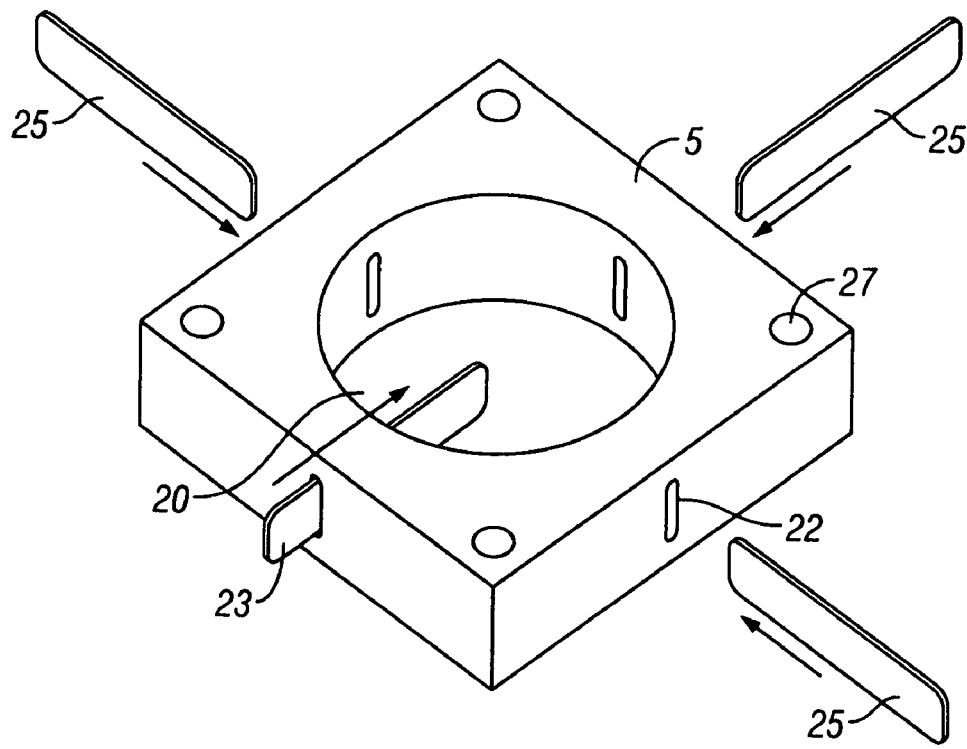
FIG. 5 depicts insertion of the air fins into the slots.

FIG. 5 shows insertion of the air fins 25 into the slots 22. The air fins 25 are preferably made of aluminum and should be thin enough to let air pass yet wide enough for structural strength. The air fins 25 should preferably be a length that allows them to extend to about the center of the hole. In the preferred embodiment, there are four air fins that are 1/16" thick, 1/2" wide, and 1 7/8" long. They are preferably smoothed to eliminate sharp edges and slightly rounded with a file. The air fins 25 are inserted into the air fin slots 22. Preferably, about 3/8" of air fins 25 are left exposed 23 on the outer sides of block spacer 5.

Figure 6:
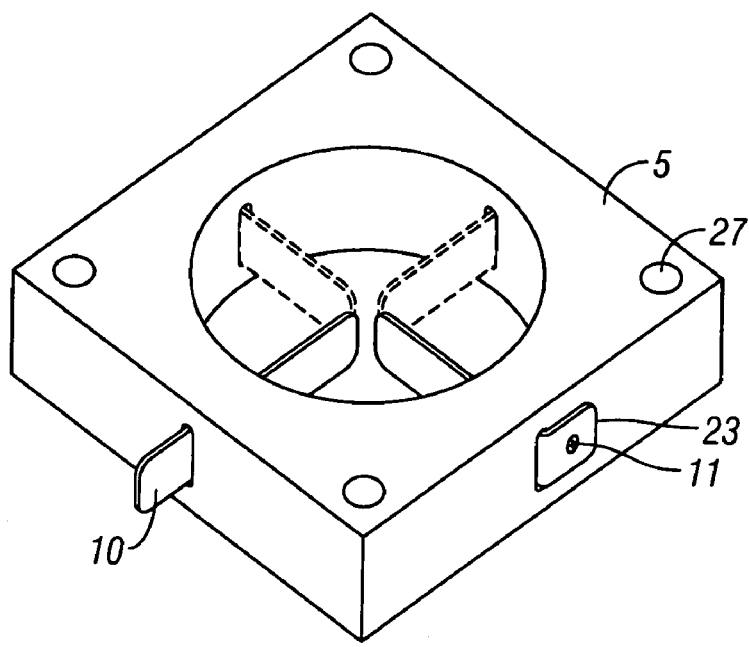
FIG. 6 depicts a spacer block with inserted air fins showing the outer part of the fin after being flattened and fastened.
Figure 7:
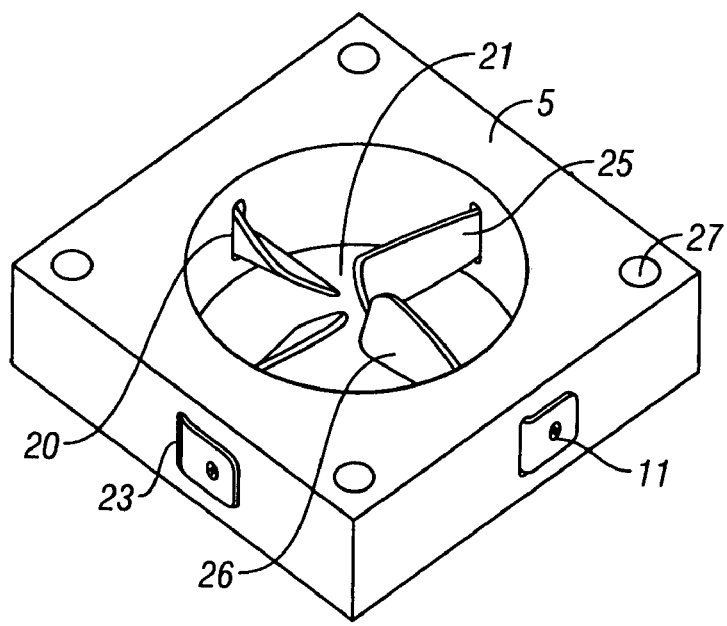
FIG. 7 shows the spacer block with inserted air fins, bent to the desired angle.
Figure 8:
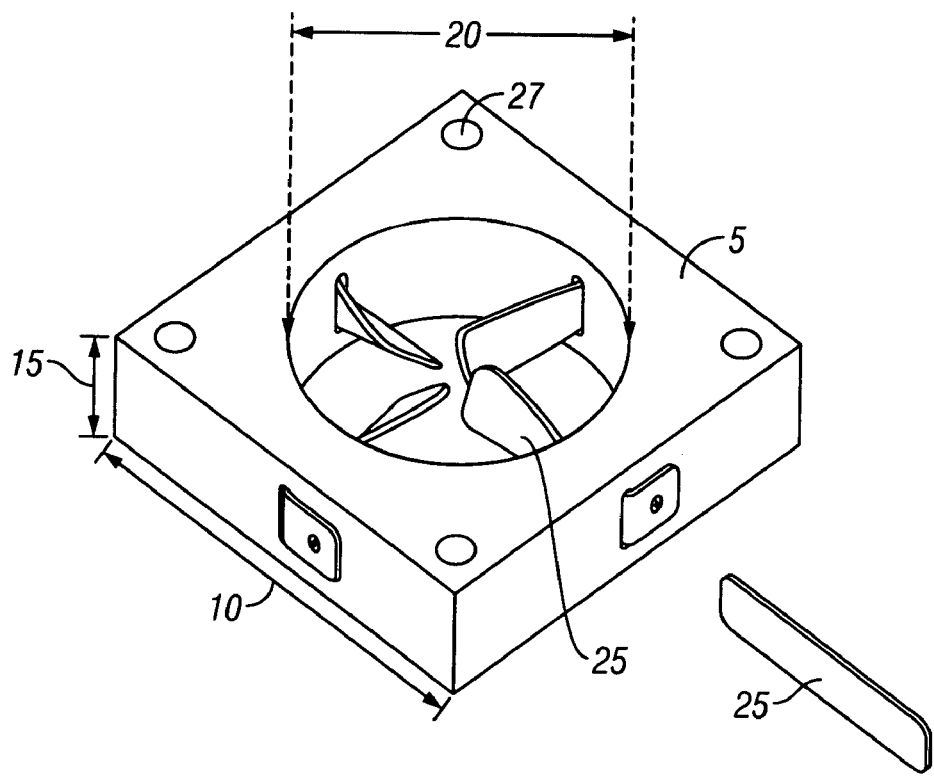
FIG. 8 shows dimensions of the preferred embodiment.
Figure 9:
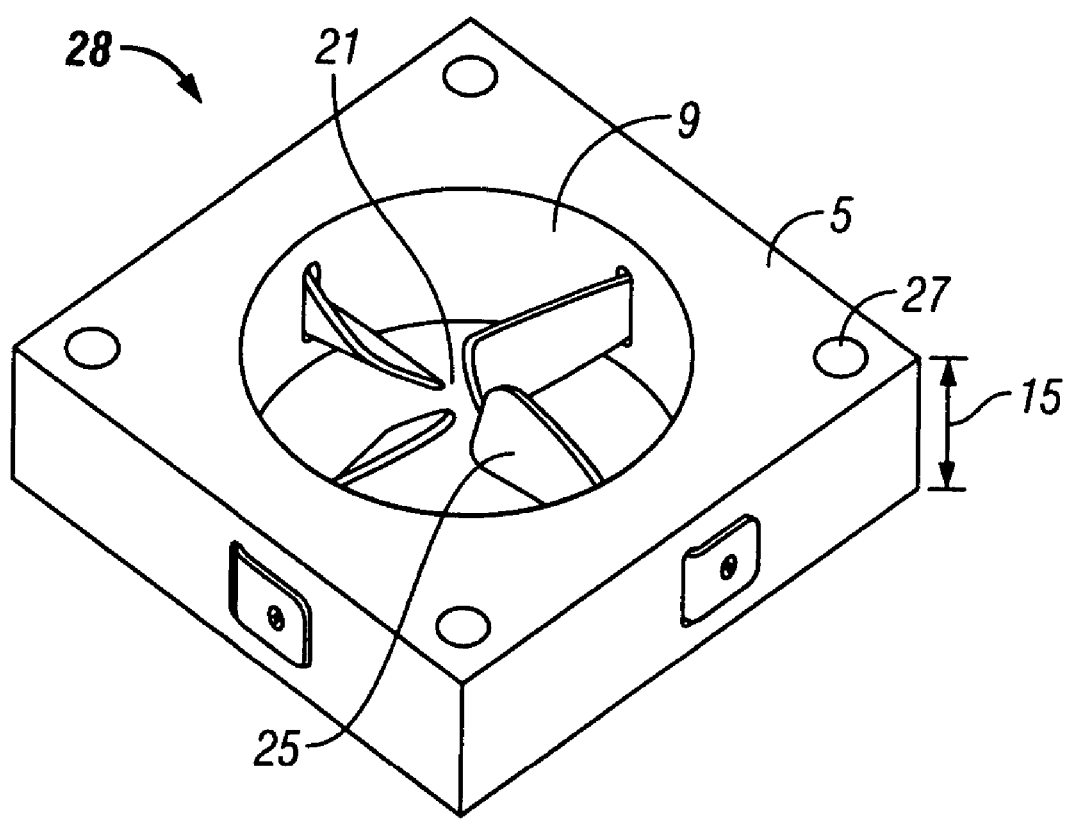
FIG. 9 shows a finished throttle body spacer.
Figure 10:
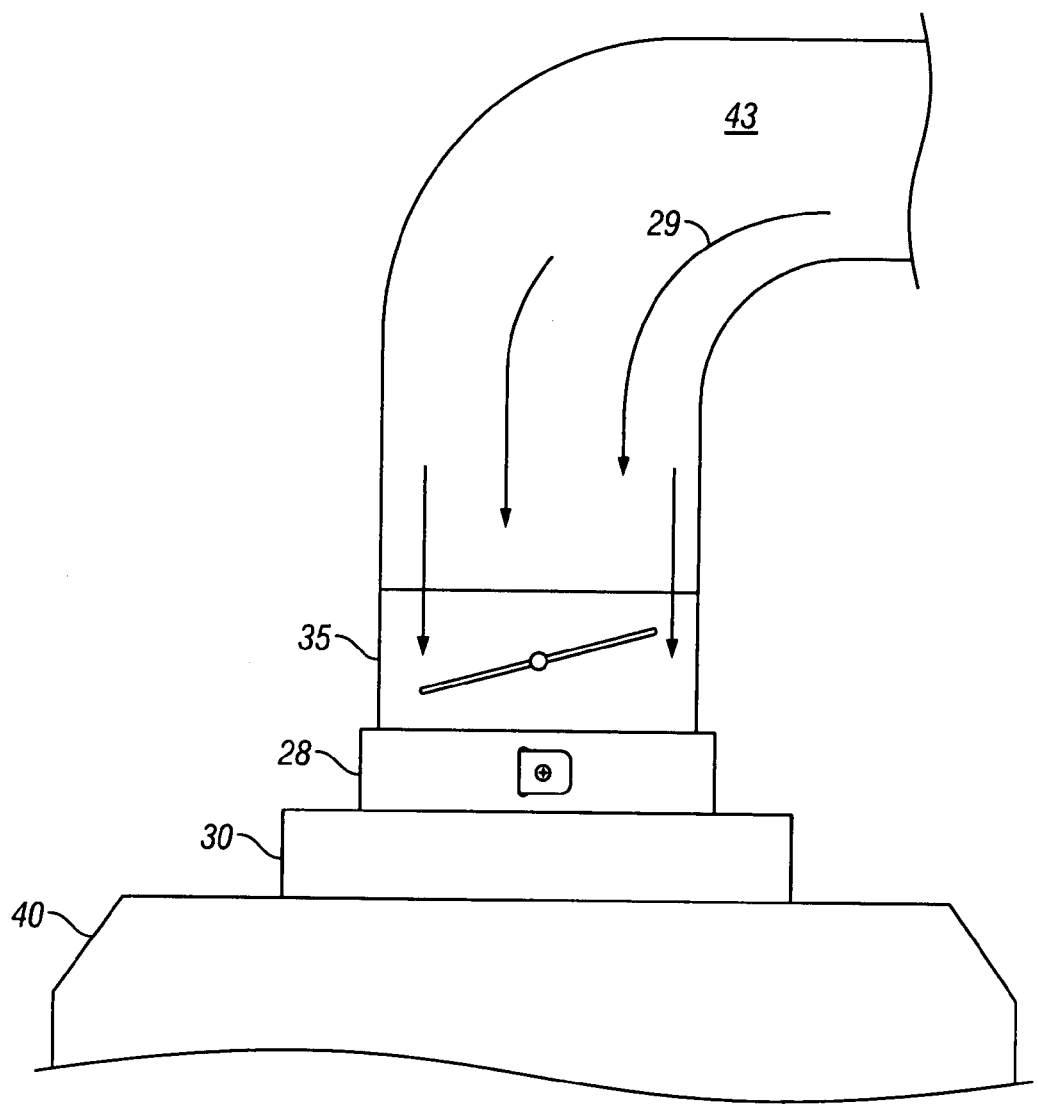
FIG. 10 depicts the throttle body spacer after it has been installed.

FIG. 6 shows one of the outer ends 10 of an air fin 25. For fastening, an outer end 10 can be bent until it is flat against spacer block 5. Then a hole, preferably 1/8" is drilled and a screw 11 is inserted as shown. The same process is repeated for all four sides 14. FIG. 7 shows the air fins 25 after they have been inserted and fastened. The air fins 25 are bent to form an angle ranging from about 1 degree to 90 degrees. In the preferred embodiment, the air fins 25 are bent to a 45 degree angle. This can be achieved by using pliers to grab and twist the end 28 of the air fin 25. The 45 degree angled air fins 25 create air turbulence that has greater force upon entering the manifold 35 (FIG. 10). FIG. 8 shows dimensions of the preferred embodiment. The finished throttle body spacer 28 is shown in FIG. 9. Preferably the air fins 25 are of a length that allows them to extend from the inner surface 9 of the bore 20 to about the center 21 of the bore.

FIG. 10 gives a profile view of an inserted throttle body spacer 28. It is placed between the throttle body 35 and the intake manifold 30. The direction of the airflow 29 is such that it goes through the throttle body 35 before reaching the new throttle body spacer 28 and then into the intake manifold 30.

As can be seen for the foregoing description of the preferred and alternate embodiments, the present invention is intended to increase horsepower, torque, and fuel efficiency of internal combustion engines. Although the primary market for the product is the automotive industry, other models can be developed for use with any internal combustion engine. Although exemplary embodiments of the present invention have been shown and described, many changes, modifications, and substitutions may be made by one having ordinary skill in the art without necessarily departing from the spirit and scope of the invention.

What is claimed is:

1. A throttle body spacer for improved engine horsepower, torque, miles per gallon, and improved quicker throttle response comprising:
    (a) a spacer block having a smooth bore hole;
    (b) a plurality of air fins, each air fin is connected at one end to the spacer block and the distal end extending to about the center of the bore hole; and
    (c) the spacer block having a mounting to hold the spacer block in place.

2. The throttle body spacer of claim 1, wherein the spacer block is comprised of thermoset resin.

3. The throttle body spacer of claim 2, wherein the thermoset resin comprises virgin Teflon®.

4. The throttle body spacer of claim 1, wherein the length of the spacer block ranges from about 3 inches to 7 inches.

5. The throttle body spacer of claim 1, wherein the width of the spacer block ranges from about 3 inches to 7 inches.

6. The throttle body spacer of claim 1, wherein the height of the spacer block ranges from about 3/8 inch to 2 inches.

7. The throttle body spacer of claim 1 wherein the dimensions of the spacer block are 3 3/8 inch×3 1/8 inch×1 inch.

8. The throttle body spacer of claim 1, wherein the air fins are formed from aluminum.

9. The throttle body spacer of claim 1, wherein the air fins are bent at an angle ranging from about 1 degree to 90 degrees.

10. The throttle body spacer of claim 1, wherein the spacer block has a bore hole with a diameter ranging from about 55 millimeters to 75 millimeters.

11. The throttle body spacer of claim 1, wherein the spacer block has a bore hole with a diameter of 60 millimeters.

12. The throttle body spacer of claim 11, wherein at least one air fin is connected to extend from about the middle of each side of the spacer block.

13. The throttle body spacer of claim 12, wherein the air fins are about 1⅞ inches long inch wide and 1/16 inch thick.

14. The throttle body spacer of claim 13, wherein the air fins are bent at a 45 degree angle.

15. The throttle body spacer of claim 1, wherein the means for mounting the throttle spacer body to hold it in place comprises a hole in each corner of the spacer block for receiving fastening elements.

16. A method for manufacturing a throttle body spacer for improved engine horsepower, torque, miles per gallon, and improved quicker throttle response which comprises:
   (a) making a spacer block with smooth edges comprised of thermoset resin;
   (b) making a smooth bore hole in the spacer block; and
   (c) fastening air fins to the spacer block, the air fins extending from the inner surface of the bore to about the center of the bore.

17. The method of claim 16 further including the step of bending the air fins at an angle ranging from about 1 degree to 90 degrees.

18. A method of intermixing fuel and air in an internal combustion engine comprising the steps of:
   (a) introducing air through a throttle body into a throttle body spacer with a bore having air fins extending across the diameter to the center of the bore;
   (b) causing the air to become turbulent by causing the air to flow across the air fins;
   (c) introducing the turbulent air having increased force and velocity into a manifold;
   (d) causing the turbulent air to become intermixed with the fuel; and
   (e) atomizing the air fuel mixture as it enters the engine.

* * * * *